US012549556B2

United States Patent
Llamas Virgen et al.

(10) Patent No.: US 12,549,556 B2
(45) Date of Patent: Feb. 10, 2026

(54) UTILIZING PATTERNS IN OPERATION OF USER INPUT DEVICES FOR USER AUTHENTICITY VERIFICATION

(71) Applicant: INTERNATIONAL BUSINESS MACHINES CORPORATION, Armonk, NY (US)

(72) Inventors: Paul Llamas Virgen, Guadalajara (MX); Jonathan Orozco Cervantes, Guadalajara (MX); Andres Alejandre Jimenez, Guadalajara (MX); Alan Verdugo Muñoz, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 18/329,185

(22) Filed: Jun. 5, 2023

(65) Prior Publication Data

US 2024/0406182 A1 Dec. 5, 2024

(51) Int. Cl.
*H04L 9/40* (2022.01)
*G06F 21/31* (2013.01)
*G06N 20/00* (2019.01)

(52) U.S. Cl.
CPC ......... *H04L 63/102* (2013.01); *G06F 21/316* (2013.01); *H04L 63/1425* (2013.01); *G06F 2221/2133* (2013.01); *G06N 20/00* (2019.01); *H04L 63/101* (2013.01)

(58) Field of Classification Search
CPC . H04L 63/102; H04L 63/1425; G06F 21/316; G06F 2221/2133; G06N 20/00
See application file for complete search history.

(56) References Cited

U.S. PATENT DOCUMENTS

| | | | |
|---|---|---|---|
| 10,135,848 B2 | 11/2018 | Muddu | |
| 11,009,961 B2 | 5/2021 | Moscarillo | |
| 11,222,101 B1* | 1/2022 | Zaslavsky | G06F 17/18 |
| 11,301,550 B2 | 4/2022 | Grajek | |
| 11,451,532 B2 | 9/2022 | Arif Khan | |
| 2017/0289168 A1* | 10/2017 | Bar | H04L 63/1408 |
| 2018/0069867 A1* | 3/2018 | Grajek | G06N 7/00 |

(Continued)

OTHER PUBLICATIONS

Gonzalez-Manzano, L., Fuentes, J. M. D., & Ribagorda, A. (2019). Leveraging user-related internet of things for continuous authentication: A survey. ACM Computing Surveys (CSUR), 52(3), 1-38. (Year: 2019).*

(Continued)

*Primary Examiner* — Robert B Leung
(74) *Attorney, Agent, or Firm* — Yuanmin Cai (57) ABSTRACT

A computer system includes: a processor; a memory in communication with the processor; multiple user input devices; and a security tool to capture data defining usage patterns of an authorized user operating the multiple user input devices to prepare an authorized user profile and to implement security measures when usage patterns of a current user differ from the usage patterns of the authorized user from the profile. The security tool calls a Machine Learning Model (MLM) that is trained on the usage patterns of the authorized user from the profile, the MLM predicting for the security tool whether usage patterns of the current user indicate that the current user is not the authorized user based on the training of the MLM.

15 Claims, 8 Drawing Sheets

(56) References Cited

U.S. PATENT DOCUMENTS

| | | | |
|---|---|---|---|
| 2018/0293367 A1* | 10/2018 | Urman | G06F 21/32 |
| 2020/0401612 A1 | 12/2020 | Dotan-Cohen | |
| 2021/0250342 A1* | 8/2021 | Budman | G06N 7/01 |
| 2022/0222326 A1* | 7/2022 | Wing | G06F 11/3438 |
| 2022/0224683 A1 | 7/2022 | Solano Gomez | |
| 2022/0350869 A1 | 11/2022 | Progonov | |
| 2022/0400130 A1* | 12/2022 | Kapoor | H04L 63/10 |
| 2023/0095415 A1* | 3/2023 | Boyer | G06F 21/556 726/23 |

OTHER PUBLICATIONS

A Method of User Identity Detection Based on Behavior Learning, IP.com No. IPCOM000263980D, Published Oct. 29, 2020.

A. Peacock, Xian Ke and M. Wilkerson, "Typing patterns: a key to user identification," in IEEE Security & Privacy, vol. 2, No. 5, pp. 40-47, Sep.-Oct. 2004, doi: 10.1109/MSP.2004.89.

A. T. Kiyani et al., Continuous User Authentication Featuring Keystroke Dynamics Based on Robust Recurrent Confidence Model and Ensemble Learning Approach, in IEEE Access, vol. 8, pp. 156177-156189, 2020, doi: 10.1109/ACCESS.2020.3019467.

Wahyudi Martono et al., Keystroke Pressure-Based Typing Biometrics Authentication System Using Support Vector Machines, International Conference on Computational Science and Its Applications; ICCSA 2007: Computational Science and Its Applications—ICCSA 2007 pp. 85-93.

Unknown, "Check your typing skills in a minute", Retrieved from: https://web.archive.org/web/20230310031640/https://www.typingtest.com/, Retrieved on: Mar. 10, 2023, 3 pages.

Unknown, "Cyber Security Market Size, Share & Trends Analysis Report by Component, by Security Type, by Solution, by Services, by Deployment, by Organization Size, by Application, by Region, and Segment Forecasts, 2023-2030", Retrieved from: https://web.archive.org/web/20230912221556/https://www.grandviewresearch.com/industry-analysis/cyber-security-market, Retrieved from the internet on Sep. 12, 2023, 10 pages.

Unknown, "IBM Security QRadar SIEM", Retrieved from: https://web.archive.org/web/20220925185554/https://www.ibm.com/products/qradar-siem, Retrieved on: Sep. 25, 2022, 8 pages.

Unknown, "IBM Threat Detection and Response Services", Retrieved from: https://web.archive.org/web/20240806005313/https://www.ibm.com/services/threat-detection-response, Retrieved from the internet on Aug. 6, 2024, 4 pages.

* cited by examiner

UTILIZING PATTERNS IN OPERATION OF USER INPUT DEVICES FOR USER AUTHENTICITY VERIFICATION

BACKGROUND

The use of computers and computer networks is ubiquitous for an endless array of tasks and applications. This includes laptop, desktop and tablet computers, as well as mobile phones and other devices. Many operations on a computer or workstation, or even access to the computer itself, may require the user to open a secure session by entering login credentials, such as a username and password, or using other means, such as biometric measures, of authenticating the user. These biometric measures may include facial or fingerprint recognition.

While working on a computer or workstation, a user may frequently step away from the computer for a variety of reasons, such as to use the restroom, get something to eat or perform another task or errand. In such cases, people sometimes leave a secure session open on the computer. The secure session may remain open until either a cookie expires, the session otherwise reaches an expiration point, or someone manually logs out of the session, e.g., closes out of the webpage, system or application that is logged in and supporting the secure session. This process can take anywhere from minutes to a few hours to even days or weeks depending on the application. During the time that a computer is left unattended with a secure session open and the time that the secure session automatically terminates, an unauthorized user can potentially access the computer and also have access to the secure session. This presents a security issue for the user who has left a secure session available and the computer unattended for whatever reason.

Similarly, a user will sometimes compromise the secrecy of their login credentials. When an unauthorized user obtains valid security credentials, that unauthorized user is able to create a new secure session illicitly.

SUMMARY

According to an example of the present subject matter, a computer system includes: a processor; a memory in communication with the processor; multiple user input devices; and a security tool to capture data defining usage patterns of an authorized user operating the multiple user input devices to prepare an authorized user profile and to implement security measures when usage patterns of a current user differ from the usage patterns of the authorized user from the profile. The security tool calls a Machine Learning Model (MLM) that is trained on the usage patterns of the authorized user from the profile, the MLM predicting for the security tool whether usage patterns of the current user indicate that the current user is not the authorized user based on the training of the MLM.

In another example, a method provides security for a computer system that includes a processor, a memory in communication with the processor, multiple user input devices, and a security tool. The method includes, with the security tool, capturing data defining usage patterns of an authorized user operating the multiple user input devices to prepare an authorized user profile; with the security tool, calling a Machine Learning Model (MLM) that is trained on the usage patterns of the authorized user from the profile, the MLM predicting for the security tool whether usage patterns of the current user indicate that the current user is not the authorized user based on the training of the MLM; and with the security tool, implementing security measures when usage patterns of a current user differ from the usage patterns of the authorized user from the profile causing the MLM to predict that the current user is not the authorized user.

In another example, a computer program product includes a non-transitory computer readable medium storing instructions for a processor. The instructions, when implemented by the processor alone or in combination with other processors, cause the processor to implement a security tool for a computer. The security tool captures data defining usage patterns of an authorized user operating multiple user input devices to prepare an authorized user profile. The security tool calls a Machine Learning Model (MLM) that is trained on the usage patterns of the authorized user from the profile, the MLM predicting for the security tool whether usage patterns of the current user indicate that the current user is not the authorized user based on the training of the MLM. The security tool implements security measures when usage patterns of a current user differ from the usage patterns of the authorized user from the profile causing the MLM to predict that the current user is not the authorized user.

BRIEF DESCRIPTION OF THE DRAWINGS

The drawing and figures depict examples of the subject matter described in the present specification. These illustrations are by way of example only, not by way of limitation to the appended claims. In the figures, like reference numerals refer to the same or similar elements. It should also be understood that the drawings are not necessarily to scale.

DETAILED DESCRIPTION

As noted above, during the time that a computer is left unattended with a secure session open and the time that the secure session automatically terminates, an unauthorized user can potentially access the computer and also have access to the secure session. This presents a security issue for the user who has left a secure session available and the computer unattended for whatever reason. A similar security issue is presented when a user's credentials for a secure service are compromised and someone other than the authorized user illicitly initiates a secure session by inputting the authorized user's valid credentials.

As used herein, the term "secure session" refers to any session that requires a user authentication mechanism before permitting the user access, including, for example, any website, database, application or even the operating system or access to the computer itself. As used herein, the term "computer" refers expansively to any device that might be used to access a secure session, including but not limited to a laptop, desktop or tablet computer, a workstation, or phone or other mobile device.

To ameliorate the security risks associated with compromised security credentials or a computer left unattended with a secure session open, it can be noted that each individual user has a specific usage pattern on the user input devices of a computer and will have certain traits when operating the computer or application that are particular to the individual. Recognizing individual usage patterns provides a way to identify or authenticate a user who is currently operating the computer. If the usage pattern does not match the usage pattern of the user that is currently authenticated for an open secure session, this may be identified as suspicious behavior and the current user can be re-authenticated, logged out or refused further access to the secure session. In this way, the security risks described above can be significantly reduced.

A fundamental concept of machine learning, which is a form of artificial intelligence, is to use a large set of training data in which a variety of circumstances or inputs each result in a specified outcome. Using this training data, the machine learning model is trained to accurately predict an outcome given specified inputs. Thereafter, an input with an unknown result can be given to the machine learning model, and the model will produce a predicted outcome based on the training data.

This concept can be applied to the security risks of an unauthorized user accessing a secure session on a computer. An artificial intelligence or machine learning model (MLM) is trained based on the particular habits and characteristics of an authorized user's operation of the computer. For example, the MLM may be trained on user data that captures a user's unique behavior when operating all the user input devices, for example, both a keyboard and a pointing device such as a mouse, trackpad, joystick or the like. The user behavior may be defined by parameters such as clicks and word typed per minute, typing speed, typing or input rhythm, frequency of keystroke, use of key combinations and shortcuts, how many times backspace is used per unit of time, and similar traits.

Using such data from an authorized user, the outcome based on this input from the MLM is that the user is authorized. If the MLM then experiences user behavior that is sufficiently inconsistent with the training set, i.e., the characteristics of the authorized user, the output of the MLM is that the current user is unauthorized and security measures to protect the secure session from abuse can be implemented.

In summary, a security system is described herein that including an MLM to identifies a current user as an authorized user or that the current user is unauthorized and is either accessing an unattended secure session or illicitly opening a secure session with stolen credentials. The system will first create an authorized user profile that captures how a particular authorized user operates the user input devices of the computer, e.g., with user behaviors or patterns, such as typing speed, frequency of keystrokes, usage of key combinations or shortcuts. When the user profile is complete, the MLM or artificial intelligence of the security system will then be trained to recognize the authorized user of the user profile based on these characteristics, i.e., the data of the user profile is the training set for the MLM. Then, the MLM can compare current activity on the computer to the characteristics of the authorized user to determine if the current user really is or is not the authorized user of the user profile.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse or any given order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

As used in the present specification and in the appended claims, the term "a number of" or similar language is meant to be understood broadly as any positive number including 1 to infinity.

Figure 1:
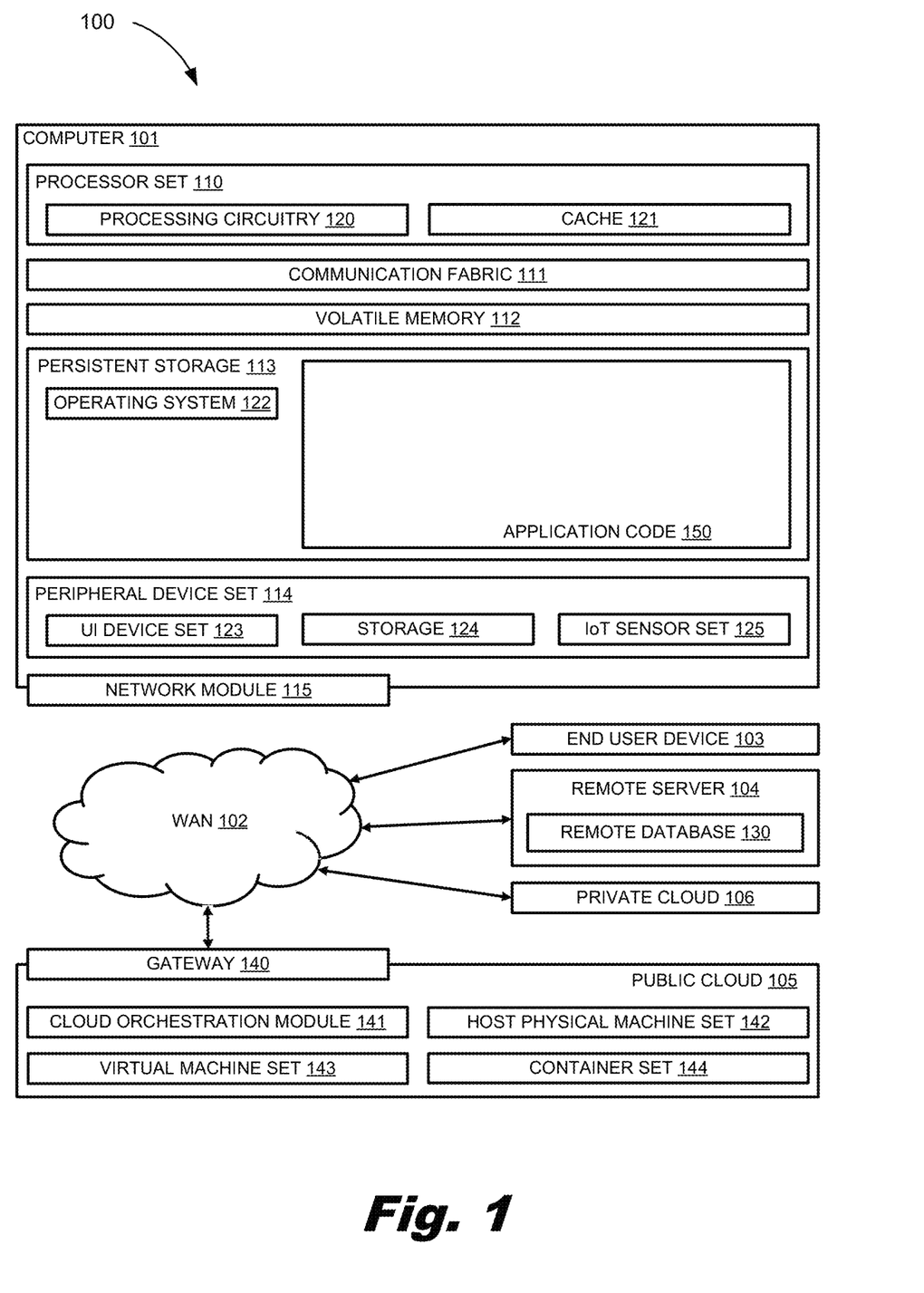
FIG. 1 depicts a computing environment for the execution of a computer-implemented method or application, according to an example of the principles described herein.

Turning now to the figures, FIG. 1 depicts a computing environment 100 for the execution of unknown object sub-class identification, according to an example of the principles described herein.

Computing environment 100 contains an example of an environment for the execution of at least some of the computer code involved in performing the inventive methods, an application to provide context specific recommendations to producers regarding the satisfaction of their users. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

The EUD 103 may be a client device operated by a producer of services or products that wants an analysis of available user data to ascertain user satisfaction. Operation of the EUD 103 for this objective will be described in further detail below.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

As described further below, the EUD 103 may use the network 102 to access an application on remote server 104. The application will access, again using the network 102, available user data. The application will then analyze the user data, with context specific analysis, to ascertain user satisfaction and generate recommendations for the producer based on the analysis.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
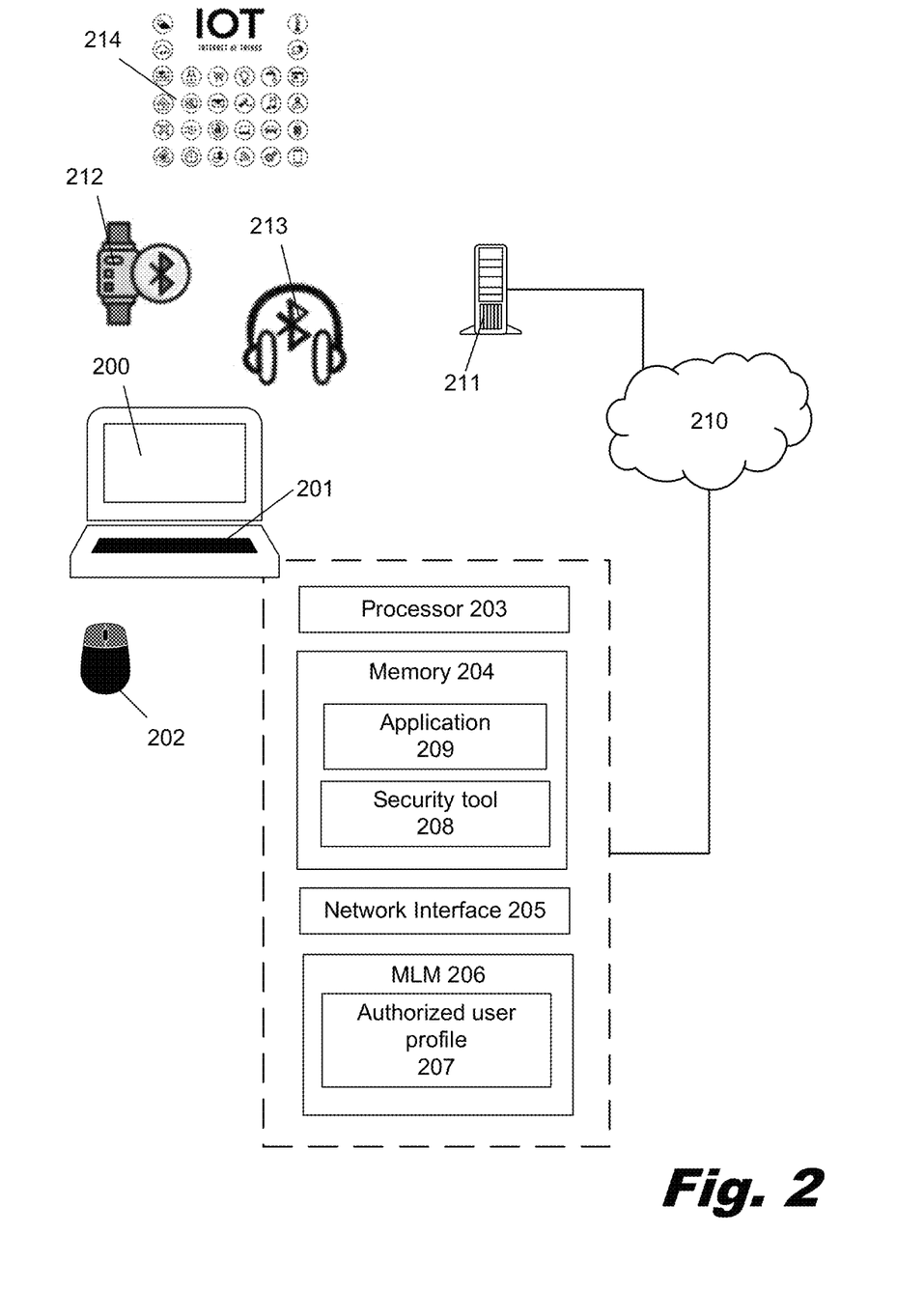
FIG. 2 illustrates an example of a secured computer system according to the principles described herein.

FIG. 2 illustrates an example of a secured computer system according to the principles described herein. As shown in FIG. 2, the computer 200 includes a set of user input devices, such as a keyboard 201 and a mouse or other pointing device 202. As noted above, the computer 200 can be any type of computing device with which a user operates a secure service or session, including access to the device itself. The computer 200 could be a laptop, desktop or tablet computer, smartphone, personal digital assistant or other computerized device. The pointing device 202 could be a mouse, trackpad, trackball, joystick or any other pointing device for user input to the computer 200. These are the most common user input devices for a computer. However, user behavior with any other user input device can also be observed and used for authentication as described herein.

The computer 200 includes a processor 203 and memory 204. The processor 203 can include any number of processing cores or processing resources. The memory 204 can include any number of volatile and non-volatile memory devices. The computer 200 can also include a network interface 205 so that the computer 200 can communicate through a network 210, such as a local or wide area network or the internet. A server 211, available over the network 210, may enter into a secure session with the computer 200 to provide a secure service.

The memory 204 can store an application 209 for implementation by the processor 203. The application 209 may be, for example, a browser or a client application for accessing services from the server 211. The memory 204 can also store a security tool 208 for implementation by the processor 203 to provide the security features described herein. Specifically, the security tool 208 is a software or firmware agent that will perform the functions described herein. Specifically, the security tool 208 will monitor the operation of the computer 200 and peripheral devices 201. 202 by an authorized user to develop an authorized user profile 207 and then use that profile to detect operation by an unauthorized user.

As described above, an Artificial Intelligence or Machine Learning Model (MLM) will be able to identify if an unauthorized person is impersonating or hijacking the account of an authorized user based on the authorized user profile 207. This is achieved by the security tool 208 providing, by means of the profile 207, data with which an MLM 206 can analyze and identify the authorized user's usage patterns on the computer 200.

Users naturally develop their own characteristic way to type and to use pointing devices. Some people type slowly and carefully, others type fast and rely on autocorrection features frequently. Some users are proficient with key combinations and shortcuts. Using such data collected by the security tool 208, the MLM 206 is trained on user data, for example, clicks and word typed per minute, typing speed, typing or input rhythm, frequency of keystroke, use of key combinations and shortcuts, how many times backspace is used per unit of time, and similar traits. A sufficiently trained AI model, e.g., MLM 206, can then detect if a different person is using a device based on all these factors, e.g., whether an unauthorized person is logged in, or impersonating, the rightful account owner.

This security tool 208 can be running in the background on computer 200, constantly learning the usage patterns of the authorized user. This will build a robust model of the authorized user's characteristics for the profile 207. This methodology is similar to how a text recommendation engine learns which words are used most frequency by a particular user. After a robust model is created, the security tool 208 is kept running in the background to detect sudden and important changes in usage patterns. When any such change is detected, the system can trigger some kind of reaction. This reaction could be, for example, instantly locking the device and asking for re-authentication or silently sending a notification to an administrator or to a security response team.

Additionally, the computer 200 will likely be operating in a space that includes a number of Internet of Things (IoT) devices. Some of which may be paired to the computer 200, such as a smartwatch 212 or a pair of wireless headphones or earbuds 213 that are regularly used by the authorized user.

As used herein, the term "Internet of Things" or "IoT" refers to a network of physical objects, devices, vehicles, and other items that are embedded with sensors, software, and connectivity, allowing them to collect and exchange data with other devices and systems over the internet. The term "IoT device" refers to any such device that is part of the IoT. The concept of IoT is based on the idea of connecting everyday objects and devices to the internet and enabling them to communicate with each other and with humans. This can include anything from smart homes and appliances, wearable devices, vehicles, industrial equipment, and more.

Consequently, the security tool 208 regularly checks for active wireless connections between the computer 200 and other devices, either fully connected or just in range of detection. The security tool 208 uses this information to check if the number of usual devices around the protected device 200 has changed significantly. If so, this can be interpreted as a sign that the computer 200 has been removed from its usual environment, perhaps by an unauthorized user, or misplaced by the authorized user. In either case, security measures, as described herein, may be implemented. For example, if the authorized user is recorded in the profile 207 as usually wearing the watch 212 and/or using the headphones 213, the absence of the watch and/or headphones when someone is operating the computer 200 may increase a confidence score that the current user is unauthorized and that security measures should be implemented. Similarly, if other IoT devices that are usually in the vicinity of the computer 200 are missing, this may increase a confidence score that the location and user of the computer 200 are unauthorized and security measures should be implemented.

Figure 3:
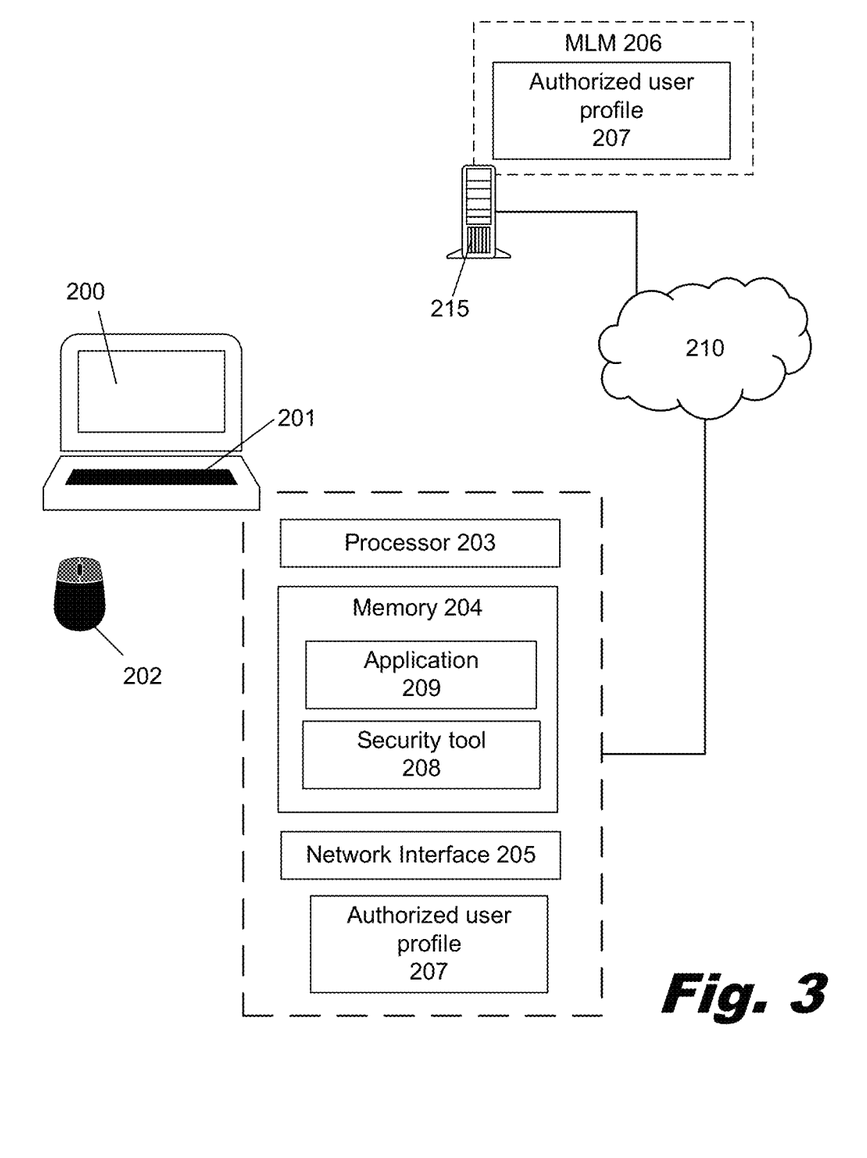
FIG. 3 illustrates another example of a secured computer system according to the principles described herein.

FIG. 3 illustrates another example of a secured computer system according to the principles described herein. The system in FIG. 3 is similar to that of FIG. 2 except that the MLM 206 can be hosted remotely on a server 215 and offered as a service to the computer 202 via the network 210. In such a case, the authorized user profile 207 would be uploaded to the MLM 206 on the server 215. The MLM 206 would then be trained on the characteristic data of the authorized user from the profile 207.

Thereafter, the security tool 208 would periodically call the MLM 206 with current user data. As described, the MLM 206 would compare the current user data, through its training, to the characteristic behavior of the authorized user. In the event that the current user data indicates that the user is not the, or an, authorized user, the output of the MLM 206 to that effect is sent as an alert back to the security tool 208. The security tool 208 then implements security measures as described herein. A variety of security measures might be implemented by the security tool 208. The particular security measure used may depend on a confidence level or accuracy threshold. Some examples are as follows.

The degree to which the behavior of a current user matches that of the authorized user can be quantified by the MLM 206. This may be referred to as an "accuracy threshold" of the current user. If the behavior of the current user with the user input devices is accurate to that of the authorized user by at least 80%, the security tool 208 can assume that the current user is the authorized user and take no action to restrict the current user's access.

| Normal System Usage Accuracy Table: | |
| --- | --- |
| Accuracy threshold | Action |
| >=80% | Leave permissions as usual |
| >=1% and <80% | Require puzzle solution. Maintain security status from puzzle solution. |

On the other hand, if the behavior of the current user on the user input devices is less than 80% of that of the authorized user, the security tool 208 may implement a precaution, such as asking the user to solve a puzzle or respond to a challenge. In such cases, inputting the solution to a puzzle or challenge will allow the security tool 208 to capture more data on the operation by the current user of the user input devices. The puzzle may be, for example, drawing a route through a two-dimensional maze using the pointing device. Another type of puzzle may be retyping a sample text that is displayed for measuring typing accuracy, speed, etc. Any such mechanism that allows the security tool 208 to capture more user behavior data with the user input devices may be used as a puzzle or challenge by the security tool 208. This challenge technique could include creating a heatmap with a puzzle to measure keystroke or using deltas to check typing accuracy or speed.

By observing the current user's response to the puzzle, additional data can be provided by the security tool 208 to the MLM 206. The MLM 206 can then compare both previous and puzzle data for the current user or just the data collected from responding to the puzzle to generate a new accuracy threshold. As indicated in the following table, various different levels of security measures can be implemented depending on the new accuracy of matching current and authorized user behaviors.

| Puzzle Accuracy Table: | |
| --- | --- |
| Accuracy threshold | Action |
| >=90% | Resume normal operation. |
| >=50% and <90% | Limit access to non-critical actions (sudo, ssh to other hosts, etc.) |
| >=10% and <50% | Limit access to read-only mode. |
| <10% | End session. Send silent alert to Cyber Security Response Team. |

The accuracy threshold can be modified based on whether the connected/available IoT devices match the user profile 207. For example, if 100% of the IoT devices identified in the authorized user profile 207 and also connected or available, the accuracy threshold may be increased by 10%. In other words, an amount of leeway in selecting a security measure based on the accuracy threshold is provided by a substantial match of IoT devices currently connected or available as compared to the IoT devices listed as connected or available in the authorized user profile 207. Below is an example table of this additional capture of accuracy taking into account registered IoT devices:

| IoT Leeway Table | |
| --- | --- |
| Leeway | Amount of IoT connected |
| 0% | No IoT devices connected |
| 2% | 20% of devices connected |
| 4% | 40% of devices connected |
| 6% | 60% of devices connected |
| 8% | 80% of devices connected |
| 10% | 100% of devices connected |

Figure 4:
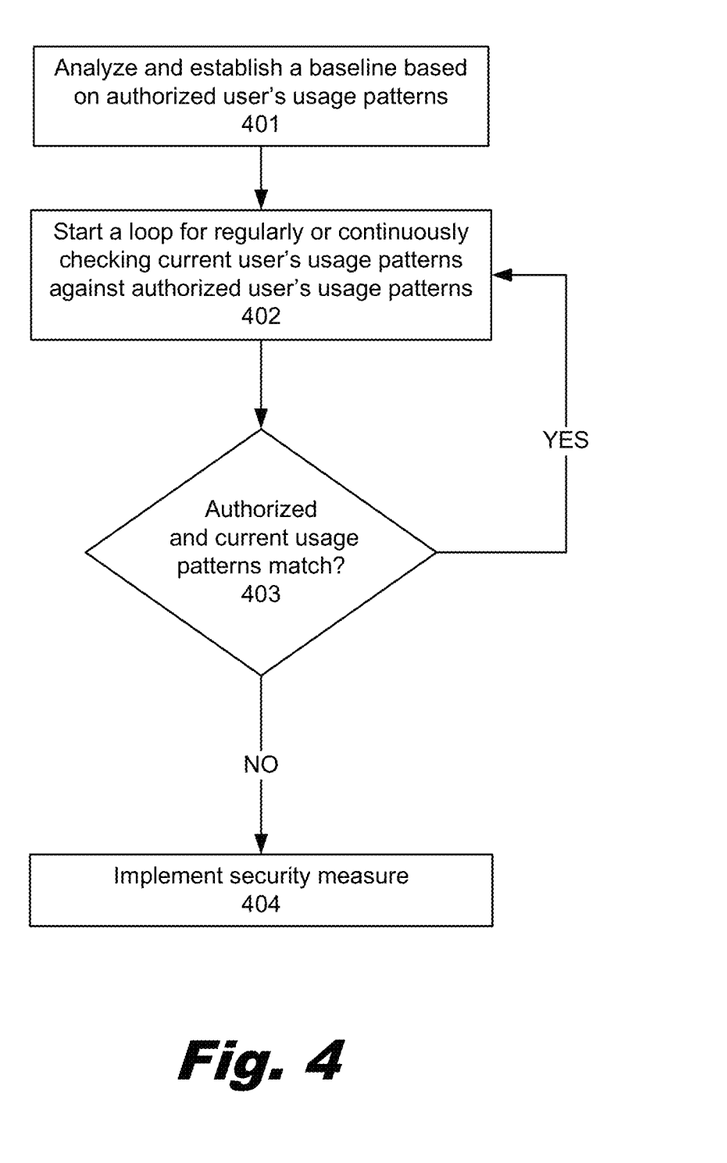
FIG. 4 is a flow chart showing an example method of operating a secured computer system according to principles described herein.

FIG. 4 is a flow chart showing an example method of operating a secured computer system according to principles described herein. As shown in FIG. 4, and described generally above, the method begins by defining the behavior of at least one authorized user as a baseline for the authorized user profile. This includes analyzing data 401 from user input devices to establish a baseline based on an authorized user's usage patterns.

With this baseline, a loop is started 402 to regularly or continuously check a current user's usage patterns against the baseline, i.e., against the authorized user's usage patterns. If the current and authorized usage patterns match 403, the method assumes an authorized user is operating the computer or secured session and allows continued operation. Monitoring then continues to ensure that only the authorized user operates the computer.

If, at any time, the current usage pattern does not match the authorized usage pattern 403, the method implements security measures 404. As described above, there can be different levels of security measures implemented depending on how much the current usage pattern diverges from the authorized usage pattern. The security measures implemented may also describe presenting a challenge, such as a puzzle, as described above, to increase a confidence level that the current user is or is not authorized.

Figure 5:
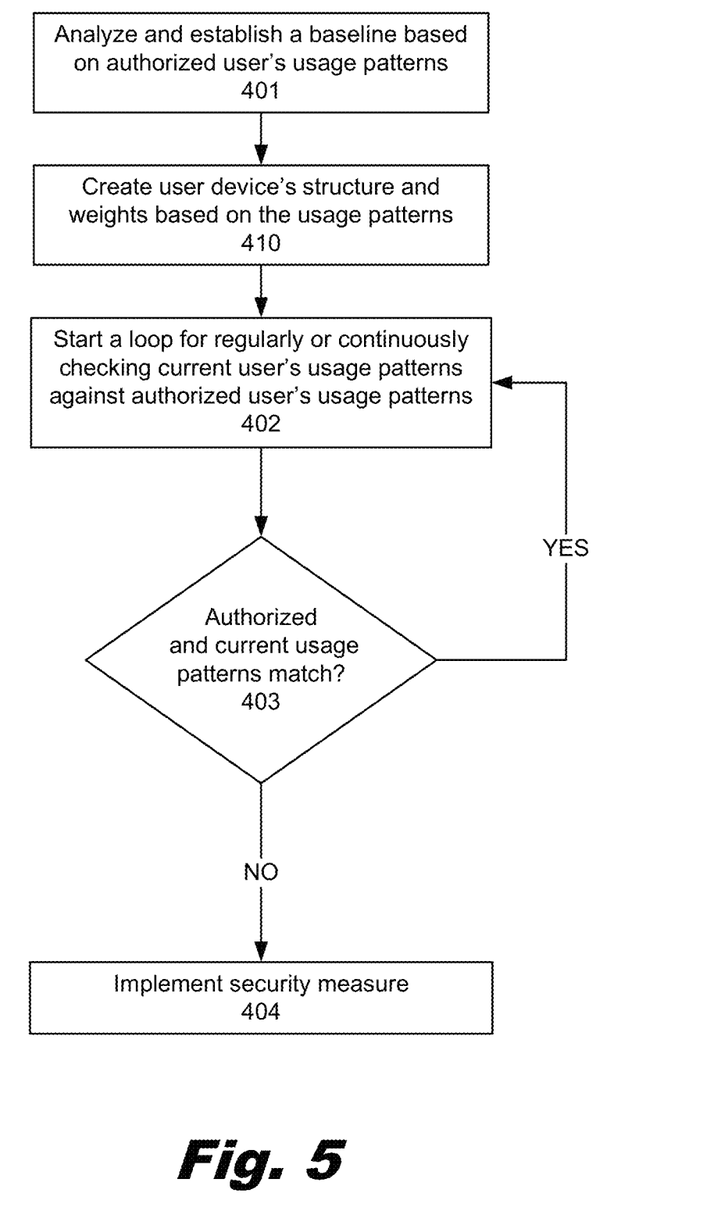
FIG. 5 is a flow chart showing another example method of operating a secured computer system according to principles described herein.

FIG. 5 is a flow chart showing another example method of operating a secured computer system according to principles described herein. This method is substantially similar to the method of FIG. 4. However, the method of FIG. 5 adds that, after establishing the baseline 401, the method can include creating user device structure and weights based on the usage patterns 410. This refines the data in the authorized user profile to potentially improve the detection of an unauthorized user.

Figure 6:
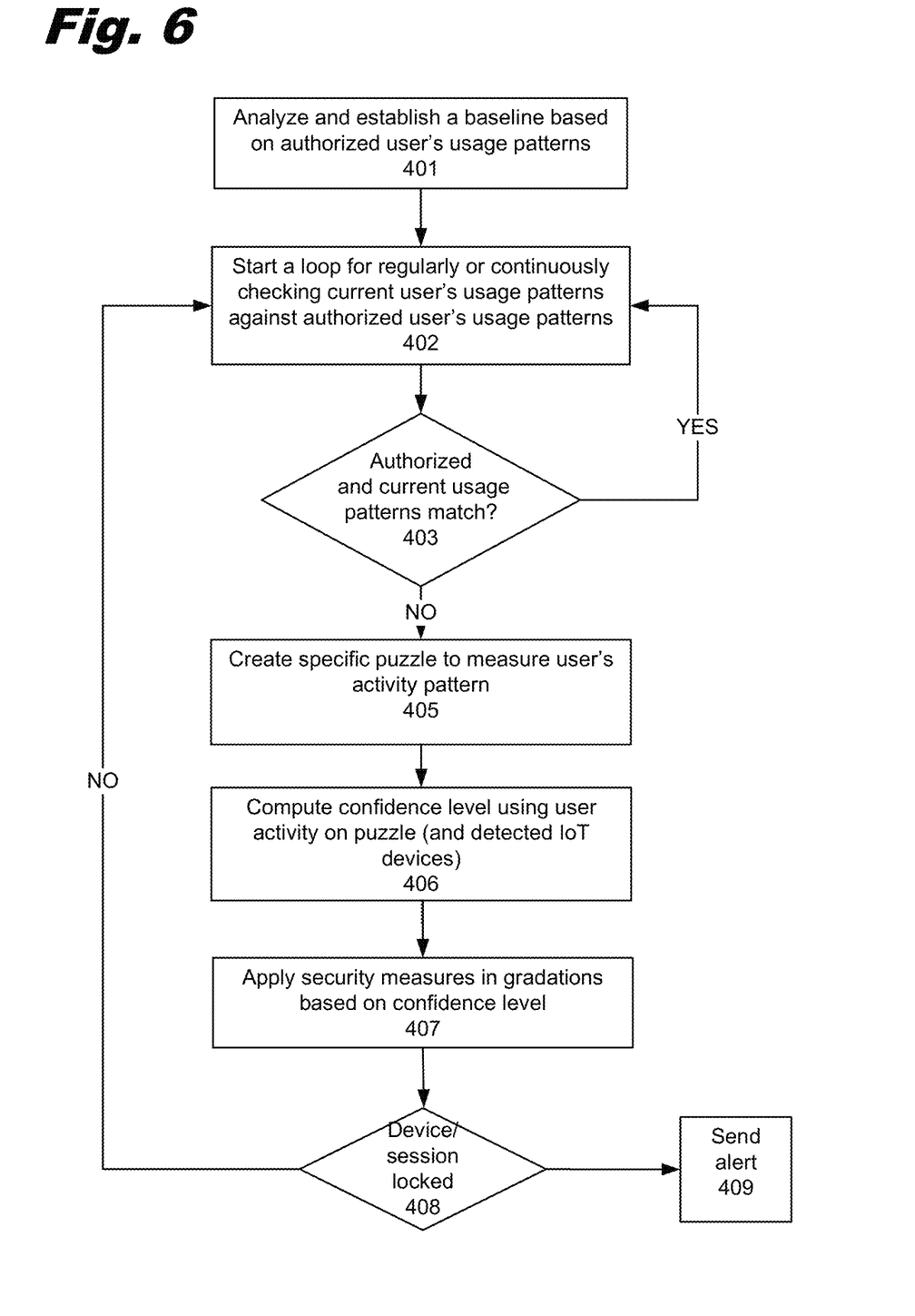
FIG. 6 is a flow chart showing another example method of operating a secured computer system according to principles described herein.

FIG. 6 is a flow chart showing another example method of operating a secured computer system according to principles described herein. This method is also substantially similar to the method of FIG. 4, but adds expressly that, if the current and authorized usage patterns do not match 403, the method will create a specific puzzle or challenge to better measure the current user's activity pattern. As described above, using the data collected from having the current user respond to the puzzle or challenge, the method computes a confidence level that the current user is or is not authorized. As also described above, this may include factoring in the IoT devices that are currently detected as compared to the IoT devices listed in the authorized user's profile.

Security measures are then applied in gradations 407 based on the confidence level (with or without factoring in the IoT devices detected). For example, the security measures may limit access to non-critical actions or functions, may limit access to a read-only mode or may end the secure session entirely. If the computer device or session is ended or locked 408, an alert may be sent 409 to an authorized user, administrator or other security function or personnel.

Figure 7:
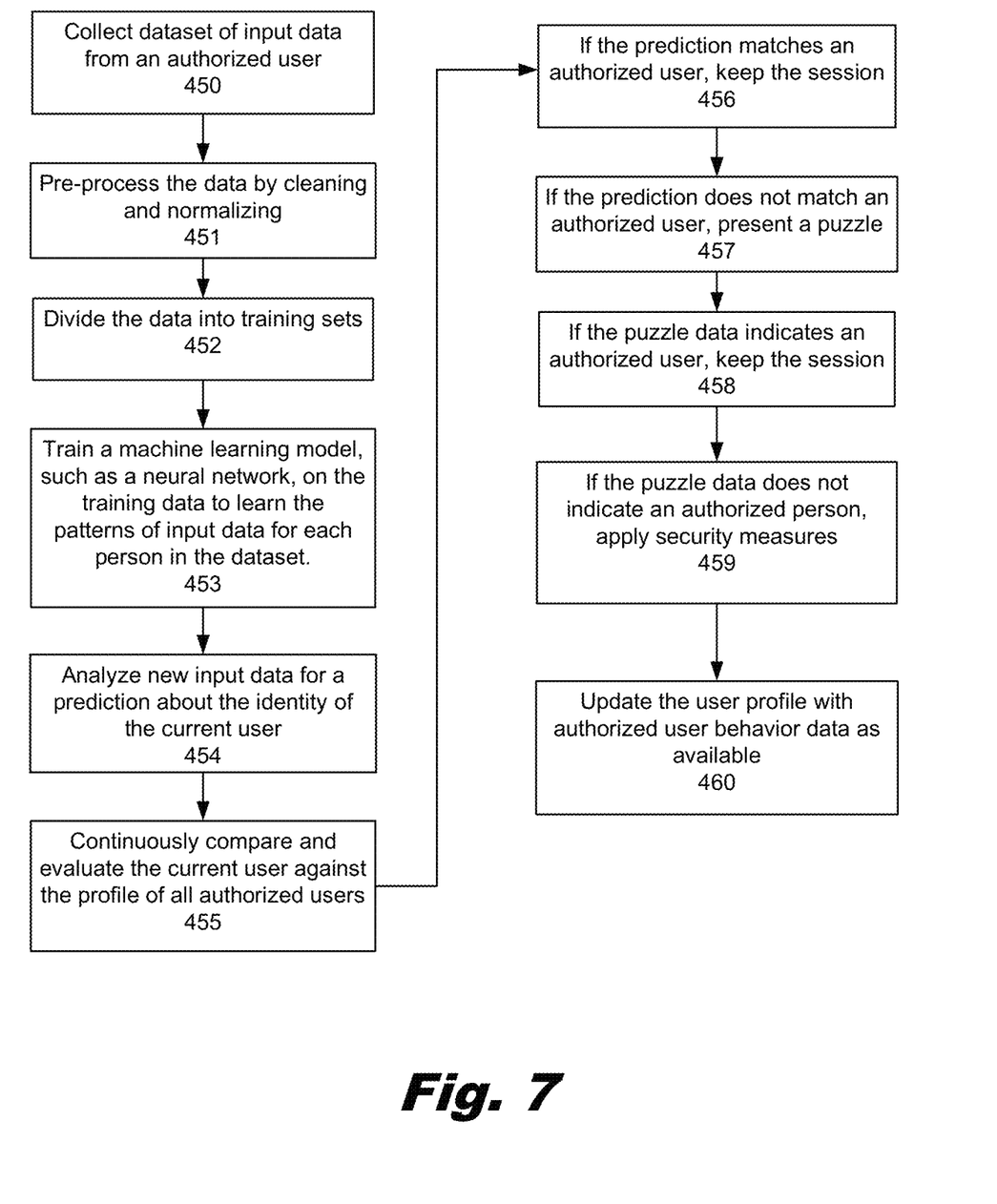
FIG. 7 is a flow chart showing another example method of operating a secured computer system according to principles described herein.

FIG. 7 is a flow chart showing another example method of operating a secured computer system according to principles described herein. FIG. 7 is an alternative description of a step-by-step process of utilizing the system of FIGS. 2 and 3 is described as follows: (1) Collect a dataset of input data from a person 450. The dataset should include information such as the movement trajectory, speed, acceleration of the mouse, trackpad or trackpoint, the typing speed, rhythm and keystrokes of the keyboard, and data from IoT devices such as accelerometer, gyroscope and touchpad sensors in case of any. (2) Pre-process the data by cleaning and normalizing it 451, and then divide it into training and testing sets 452. For example, each variable in the user behavior could be divided into a separate training set. Thus, typing speed data, typing accuracy, pointer movement speed, etc. could each be one training set (3) Train a machine learning model, such as a neural network, on the training data to learn the patterns of input data for each person in the dataset 453. (4) This can include testing the model on testing data and evaluate its performance, adjusting the model as necessary. (5) Once the model has been trained and fine-tuned, it can be used to analyze new input data and make a prediction about the identity of the person using a device 454. (6) Once trained, the system would be constantly comparing and evaluating the expected individual 455. This could be a periodic comparison at regular time intervals or an ongoing comparison. (7) If the prediction matches the expected, i.e., authorized, person, the method keeps the session 456. (8) If the prediction does not match the expected person, present the user with a puzzle to solve which involves measurements of specific typing strategies, follow cursor or things related to measure specifically the expected user's regular inputs such as mouse, trackpad, keyboard combining them with IoT devices 457. (9) If the user correctly solves the puzzle or it's statistically significant enough into the threshold, keep the session 458. (10) If the user is unable to correctly solve the puzzle or gets out of the pre-established threshold, security measures are applied 459. This may include terminating the session and locking the account and/or notifying the system administrator. (11) Continuously monitor the system for any suspicious activity and update the dataset and the model accordingly 460.

Figure 8:
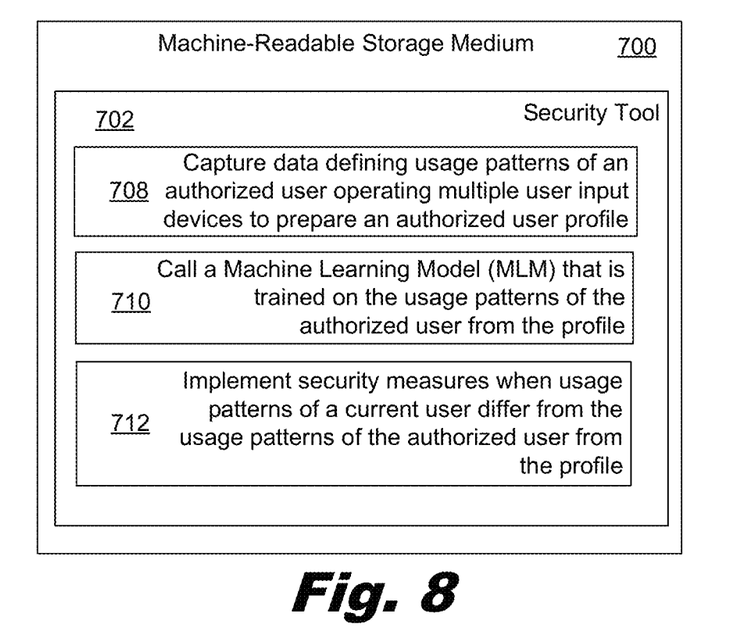
FIG. 8 is a diagram of a computer program product according to principles described herein.

FIG. 8 is a diagram of a computer program product according to principles described herein. As shown in FIG. 8, a computer program product includes a non-transitory computer readable medium 700 storing instructions for a processor, the instructions, when implemented by the processor alone or in combination with other processors, cause the processor to implement a security tool 702 for a computer. The security tool 702 includes instructions to capture 708 data defining usage patterns of an authorized user operating multiple user input devices to prepare an authorized user profile. The security tool 702 includes instructions to call 710 a Machine Learning Model (MLM) that is trained on the usage patterns of the authorized user from the profile, the MLM predicting for the security tool whether usage patterns of the current user indicate that the current user is not the authorized user based on the training of the MLM. Lastly, the security tool 702 includes instruction to implement 712 security measures when usage patterns of a current user differ from the usage patterns of the authorized user from the profile causing the MLM to predict that the current user is not the authorized user.

This following is an example of a mouse (or other pointing device) training model. The example uses the Python library pyautogui to collect mouse data, and numpy and sklearn for feature extraction and machine learning. The algorithm collects mouse data for a certain period of time and then extracts features such as distance traveled, speed, and acceleration. Then, it trains a machine learning model using those features and labels. Finally, it predicts the user by using the trained model on new data.

Mouse Pattern Training Model

```
1 import pyautogui
2
3 def collect_mouse_data( )
4 mouse_data=[ ]
5 #Collect mouse data for a certain period of time
6 for i in range(1000):
7 x, y=pyautogui.position( )
8 mouse_data.append((x, y))
9 time.sleep(0.01)
10 return mouse_data
11
12 def extract_features(mouse data):
13 x=[point [0] for point in mouse_data]
14 y=[point [1] for point in mouse data]
15 #calculate features such as distance traveled, speed and
   acceleration
16 distance=sum(np.sqrt(np.diff(x)**2+np.diff(y)**2))
17 speed=distance/len(mouse_data)*1000
18 acceleration=np.diff(speed)
19 #create a vector of features
20 features=[distance, speed, acceleration]
21 return features
22
23 def train_model(features, labels):
24 #train a machine learning model, such as a neural
   network, on the features and labels
25 model=MLPClassifier( )
26 model.fit(features, labels)
27 return model
28
29 def predict_user(mouse_data, model):
30 #extract features from new mouse data
31 features=extract features(mouse_data)
32 #make a prediction about the identity of the user using
   the trained model
33 prediction=model.predict(features)
34 return prediction
35
36 #Collect mouse data for multiple users
37 mouse_data=[ ]
38 labels=[ ]
39 for i in range(10):
40 data=collect_mouse_data
41 mouse_data.append(data)
42 labels.append(i) #Assign a label to each user's data
43
44 #Extract features from the collected mouse data
45 features=[ ]
46 for data in mouse_data:
47 features.append(extract_features(data))
48
49 #Train a machine learning model on the extracted
   features and labels
50 model=train_model(features, labels)
51
52 #Collect new mouse data for a test user
53 test_data=collect mouse_data( )
54
55 #Predict the identity of the test user
56 prediction=predict_user(test_data, model)
57 print("Predicted user:", prediction)
```

Identifying that an unauthorized user is impersonating an authorized user is a complex problem. However, due to the prevalence of systems that require some kind of authentication, it is very valuable both for end users and for the companies providing and operating those systems. If a hacker gains entry into a system with stolen credentials it is very hard to confirm that somebody else is impersonating the authorized user. After all, if the hacker is using the correct credentials (for example), it means the authentication process was completed successfully. However, the behavior of two persons generally is very different, and, as described above, this can be used to identify that an unauthorized person is taking control of someone else's account.

Since the hacker would need to imitate the typing patterns of the authorized user, and these patterns are not really stored anywhere (hence they can't be leaked or studied by hackers), this systems and methods described herein are a real time counter-measure to cyber-attacks. The use of IoT devices as an additional layer of security adds an extra reliability percentage to the authenticated user depending on the amount of devices that are detected or that the user has connected at the moment. There is a wide range of use cases for this technique. It can be implemented as a passive security measure in servers, smartphones, desktop operating systems, or even within individual applications.

Below are some use cases for the techniques described above.

Case 1: Using a Website:

The user is logged in to a website.

The website starts monitoring patterns based on mouse/keyboard usage.

The system will compare regular patterns vs. current pattern.

Comparison can include clicks per minute, mouse precision, typed words per minute, how many times backspace is used, etc.

If a discrepancy is detected in the pattern, the system will raise an alert.

This alert may just send a notification to the user or ask for re-authentication.

Case 2:

A laptop is stolen, and the person who stole it starts using it to write an email.

The typing patterns of this person will be different to the typing patterns of the rightful owner, so the system could respond in different ways.

One response could be sending a warning to the account owner, explaining that an unusual activity has been detected. Another response could be locking the entire device and ask for re-authentication.

Case 3:

A hacker gains access to a production server as a non-root user. While they are exploring the file system to gain privilege escalation, the typing patterns of the commands are analyzed and detected as too different from the usual typing of the expected user (for example, maybe the hacker types way too fast compared to the normal user).

As per the pre-defined response configured by the system administrator, alerts are triggered and sent to the security response team, the system administrator currently on-call and to the rightful account owner.

If desired, the intrusion detection system could even trigger the immediate shutdown of the server, or isolating it from the network in order to contain the hacker and reduce risk.

Case 4:

A person normally works from home with 4 wireless devices either connected to her work laptop or close enough to be detected by it. In one occasion, this person goes to work to a different place and takes all 4 of these devices with her.

The system detects that the user's typing patterns vary slightly, which drops the reliability percentage to 75%. This percentage is low enough to normally require the solution of a puzzle or a typing exercise.

Since the presence of the usual IoT devices was maintained, a 10% of reliability is added to the user identity, which brings the total to 85%. This avoids asking the user to solve a verification exercise since the devices that are usually connected are still present, which is a sign of a normal behavior by the user.

Case 5:

In a workplace, a person moves away for their workstation and leaves their laptop unlocked. While going away, they don't take any of their wireless devices along, so they remain in the close proximity of the workstation.

A co-worker notices the unlocked laptop and tries to use it.

Despite the presence of wireless devices, the co-worker's way of using the mouse and keyboard is noticeably different to the authenticated user's profile. This results in the reliability percentage to lower enough to request the solution to a verification exercise (either a puzzle or a typing exercise).

In this case, regardless of the constant presence of the IoT devices, the variation of behavior was so great that the presence of the usual devices was not enough to trust that the approved user was still using the computer, so another identity verification mechanism would be requested.

What is claimed is:

1. A computer system comprising:
a processor;
a memory in communication with the processor;
multiple user input devices; and
a security tool to capture data defining usage patterns of an authorized user operating the multiple user input devices to prepare an authorized user profile and to implement security measures when usage patterns of a current user differ from the usage patterns of the authorized user from the authorized user profile;
wherein the security tool calls a Machine Learning Model (MLM) that is trained on the usage patterns of the authorized user from the authorized user profile, the MLM predicting for the security tool whether usage patterns of the current user indicate that the current user is not the authorized user based on the training of the MLM,
wherein the MLM reports to the security tool an accuracy threshold quantifying how closely the usage patterns of the current user match the usage patterns of the authorized user from the authorized user profile; and the security tool implements different security measures based on the accuracy threshold reported, and
wherein, based on the accuracy threshold indicating that the current user is not confirmed as the authorized user, the security tool presents a puzzle or challenge to the current user, captures additional usage pattern data of the current user using one or more of the multiple user input devices in responding to the challenge, and provides the additional usage pattern data to the MLM to update the MLM prediction whether the current user is authorized.

2. The computer system of claim 1, wherein the multiple user input devices comprise both a keyboard and a pointing device of the computer system.

3. The computer system of claim 1, further comprising a network interface, wherein the security tool calls the MLM via the network interface with the MLM hosted on a network having the network interface.

4. The computer system of claim 1, further comprising a network interface for connecting to Internet of Things (IoT) devices, the security tool recording in the authorized user profile a list of IoT devices associated with the authorized user.

5. The computer system of claim 4, wherein a confidence level of the prediction of the MLM that the current user is or is not an authorized user is adjusted based on current detection of the IoT devices listed in the authorized user profile.

6. The computer system of claim 1, further comprising a network interface for connecting to Internet of Things (IoT) devices, the security tool recording in the authorized user profile a list of IoT devices associated with the authorized user, wherein a confidence level of the prediction of the MLM that the current user is or is not an authorized user is adjusted based on current detection of the IoT devices listed in the authorized user profile.

7. A method of providing security for a computer system that includes
    a processor,
    a memory in communication with the processor,
    multiple user input devices, and
    a security tool, the method comprising:
        with the security tool, capturing data defining usage patterns of an authorized user operating the multiple user input devices to prepare an authorized user profile;
        with the security tool, calling a Machine Learning Model (MLM) that is trained on the usage patterns of the authorized user from the authorized user profile, the MLM predicting for the security tool whether usage patterns of a current user indicate that the current user is not the authorized user based on the training of the MLM;
        with the security tool, implementing security measures when usage patterns of the current user differ from the usage patterns of the authorized user from the authorized user profile causing the MLM to predict that the current user is not the authorized user;
        the MLM reporting to the security tool an accuracy threshold quantifying how closely the usage patterns of the current user match the usage patterns of the authorized user from the authorized user profile; and the security tool implementing different security measures based on the accuracy threshold reported; and
        based on the accuracy threshold indicating that the current user is not confirmed as the authorized user, the security tool presenting a puzzle or challenge to the current user, captures additional usage pattern data of the current user using one or more of the multiple user input devices in responding to the challenge, and provides the additional usage pattern data to the MLM to update the MLM prediction whether the current user is authorized.

8. The method of claim 7, wherein the multiple user input devices comprise both a keyboard and a pointing device of the computer system.

9. The method of claim 7, further comprising calling the MLM via a network interface with the MLM hosted on a network remote from the computer system.

10. The method of claim 7, the computer system further comprising a network interface for connecting to Internet of Things (IoT) devices, the method further comprising, with the security tool, recording in the authorized user profile a list of IoT devices associated with the authorized user.

11. The method of claim 10, wherein a confidence level of the prediction of the MLM that the current user is or is not an authorized user is adjusted based on current detection of the IoT devices listed in the authorized user profile.

12. The method of claim 7, the computer system comprising a network interface for connecting to Internet of Things (IoT) devices, the security tool recording in the authorized user profile a list of IoT devices associated with the authorized user, wherein a confidence level of the prediction of the MLM that the current user is or is not an authorized user is adjusted based on current detection of the IoT devices listed in the authorized user profile.

13. A computer program product comprising a non-transitory computer readable medium storing instructions for a processor, the instructions, when implemented by the processor alone or in combination with other processors, cause the processor to implement a security tool for a computer, wherein:
    the security tool captures data defining usage patterns of an authorized user operating multiple user input devices to prepare an authorized user profile;
    the security tool calls a Machine Learning Model (MLM) that is trained on the usage patterns of the authorized user from the authorized user profile, the MLM predicting for the security tool whether usage patterns of a current user indicate that the current user is not the authorized user based on the training of the MLM;
    the security tool implements security measures when usage patterns of the current user differ from the usage patterns of the authorized user from the authorized user profile causing the MLM to predict that the current user is not the authorized user; and
    the security tool presents a puzzle or challenge to the current user, captures additional usage pattern data of the current user using one or more of the multiple user input devices in responding to the challenge, and provides the additional usage pattern data to the MLM to update the MLM prediction whether the current user is authorized.

14. The computer program product of claim 13, wherein the security tool calls the MLM via a network interface with the MLM hosted on a network remote from the computer.

15. The computer program product of claim 13, wherein:
    the computer further comprises a network interface for connecting to Internet of Things (IoT) devices,
    the security tool records in the authorized user profile a list of IoT devices associated with the authorized user, and
    the security tool adjusts a confidence level of the prediction of the MLM that the current user is or is not an authorized user based on current detection of the IoT devices listed in the authorized user profile.

* * * * *